United States Patent
Reuschel

(10) Patent No.: US 8,584,545 B2
(45) Date of Patent: Nov. 19, 2013

(54) DRIVE TRAIN HAVING CLUTCH ACTIVATION FOR OVERCOMING THE BACKLASH OF THE DRIVE TRAIN BEFORE START-UP

(75) Inventor: Michael Reuschel, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/331,454

(22) Filed: Dec. 20, 2011

(65) Prior Publication Data
US 2012/0160046 A1    Jun. 28, 2012

Related U.S. Application Data

(63) Continuation of application No. PCT/DE2010/000588, filed on May 27, 2010.

(30) Foreign Application Priority Data

Jun. 25, 2009 (DE) .......................... 10 2009 030 445

(51) Int. Cl.
*F16H 55/18* (2006.01)
(52) U.S. Cl.
USPC .......................................................... 74/409
(58) Field of Classification Search
USPC ............ 74/409, 440, 411.5, 406, 411, 412 R, 74/421 A; 475/331
See application file for complete search history.

(56) References Cited

U.S. PATENT DOCUMENTS

| | | | | |
|---|---|---|---|---|
| 3,485,109 A | * | 12/1969 | Dunlap ........................... | 74/409 |
| 4,912,998 A | * | 4/1990 | Sugano et al. .................. | 74/409 |
| 4,915,204 A | * | 4/1990 | Klotz et al. ................ | 192/48.61 |
| 5,067,364 A | * | 11/1991 | Janiszewski .................... | 74/440 |
| 5,517,874 A | * | 5/1996 | Janiszewski .................... | 74/325 |
| 6,021,686 A | * | 2/2000 | Mizoguchi ..................... | 74/440 |
| 6,247,439 B1 | * | 6/2001 | Gokan et al. ................ | 123/185.6 |
| 7,121,973 B2 | * | 10/2006 | Lumpkin et al. .............. | 475/266 |
| 2006/0201271 A1 | * | 9/2006 | Masui ............................. | 74/409 |
| 2007/0034034 A1 | * | 2/2007 | Bessey ............................ | 74/409 |
| 2008/0162007 A1 | * | 7/2008 | Ishii et al. ....................... | 701/54 |
| 2009/0237026 A1 | * | 9/2009 | Panaitescu et al. ........... | 318/630 |
| 2009/0314114 A1 | * | 12/2009 | Grosberg ........................ | 74/409 |
| 2010/0050799 A1 | * | 3/2010 | Brackney ........................ | 74/409 |

FOREIGN PATENT DOCUMENTS

| | | |
|---|---|---|
| EP | 0638454 | 2/1995 |
| EP | 1455108 | 9/2004 |
| WO | 0247934 | 6/2002 |

* cited by examiner

*Primary Examiner* — Ha D Ho
*Assistant Examiner* — Jude Agendia
(74) *Attorney, Agent, or Firm* — Simpson & Simpson, PLLC

(57) ABSTRACT

A drive train for a motor vehicle, including a drive unit having a drive shaft and a transmission having a transmission input shaft and a plurality of gears, of which at least one is used as a starting gear for the motor vehicle, and having a friction clutch, which is arranged between the crankshaft and the transmission input shaft and is actuated in an automated manner. In order to prevent start-up noise caused by backlashes in the motor vehicle, a backlash present in the transmission is compensated by applying a small compensating torque set at the friction clutch to the transmission input shaft while the starting gear is engaged before start up.

9 Claims, 1 Drawing Sheet

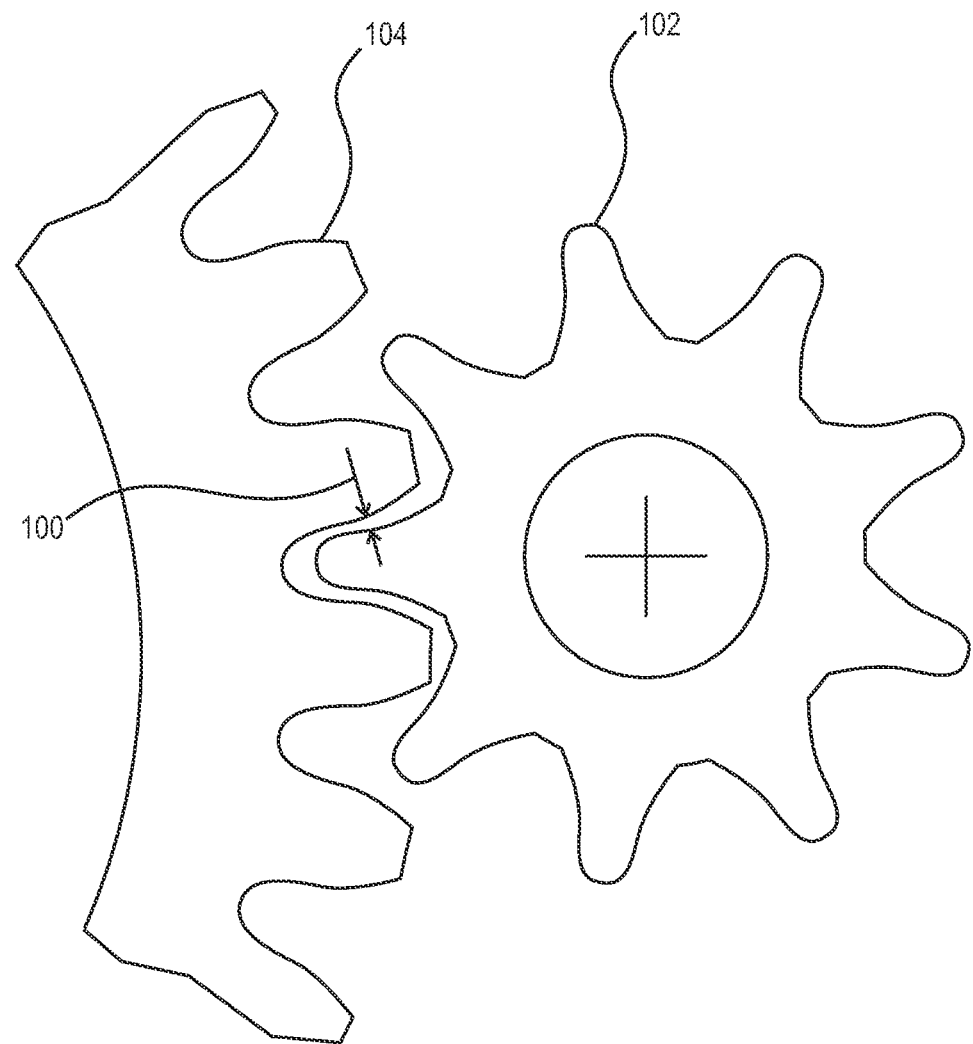

DRIVE TRAIN HAVING CLUTCH ACTIVATION FOR OVERCOMING THE BACKLASH OF THE DRIVE TRAIN BEFORE START-UP

CROSS-REFERENCE TO RELATED APPLICATIONS

This application is filed under 35 U.S.C. §120 and §365(c) as a continuation of International Patent Application No. PCT/DE2010/000588 filed May 27, 2010, which application claims priority from German Patent Application No. 10 2009 030 445.2 filed Jun. 25, 2009, which applications are incorporated herein by reference in their entireties.

TECHNICAL FIELD

The invention relates to a drive train for a motor vehicle, including a drive unit having a drive shaft and a transmission having a transmission input shaft and a plurality of gears, and having a friction clutch, which is arranged between the crankshaft and the transmission input shaft and is actuated in an automated manner.

BACKGROUND

Drive trains of this type in motor vehicles have been known for a long time. Thus, a drive shaft like a crankshaft of a drive unit like an internal combustion engine is coupled through an automated friction clutch with a transmission input shaft. The transmission can be a manually or automatically actuated shifting transmission or a dual clutch transmission with two transmission input shafts in which a respective transmission input shaft is coupled with the drive shaft through a friction clutch or the transmission can be a continuously variable chain transmission. Depending on the driving situation, the clutch torque transmitted through the friction clutch is controlled automatically. When starting up the motor vehicle, a startup routine is selected which accelerates the motor vehicle as a function of the torque desired by the driver set by the drive pedal. When only the brake of the motor vehicle is disengaged, the motor vehicle starts creeping.

Due to its configuration and in particular with increasing wear, torque clearances are provided in the transmission which facilitate rotating the transmission input shaft without torque entering e.g. through the gear pairs of the startup gear through the transmission output shaft into the wheels. The control of the friction clutch, for example, a startup- or creeping routine, thus sets a startup torque without considering the rotation clearance at the friction clutch which leads to a swift acceleration of the transmission input shaft which causes a hard impact of transmission components due to the idle travel caused by the rotation clearance when the rotation clearance is used up which causes an annoying comfort degrading noise. This annoying noise occurs even more when the motor vehicle is stopped in creeping operation before the last stop.

SUMMARY

Thus, it is the object of the invention to provide a drive train and a method for actuating and controlling the drive train in which such noises are eliminated or at least reduced. Furthermore, an improvement shall not necessitate any change in the design of the drive train. Furthermore, a solution does not require an actual or essential interference with the control of the drive unit while avoiding to introduce additional components.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1 is a schematic view of gears in a transmission with rotational clearance.

DETAILED DESCRIPTION

FIG. 1 is a schematic view of gears in a transmission with rotational clearance. The object is achieved through a drive train and a method for its actuation or control for a motor vehicle with a drive unit including a drive shaft and a transmission including a transmission input shaft and a plurality of gears, of which at least one is used as a startup gear for the motor vehicle and an automatically actuated friction clutch between crankshaft and transmission input shaft. A rotation clearance provided in the transmission before startup with the startup gear shifted is compensated by applying a small compensation torque to the transmission input shaft. The compensation torque is adjusted at the friction clutch. For example, rotation clearance 100 is provided between startup gear 102 and ear 104. Thus, the torsion clearance is removed slowly, so that the undesirable interference noise is eliminated. Thus, the compensation torque is limited so that no undesirable startup of the motor vehicle is provided. Thus, the compensation torque is adjusted smaller than a startup torque required for moving the motor vehicle, for example, using the following equations:

$$\dot{\omega}_{output} = \frac{M_{output}}{J_{TS}}$$

$$M_{output} = M_{clutch} * i_{ges} * \eta$$

$$\varphi_{output} = \int\int \dot{\omega}_{output}$$

$$\dot{\omega}_{output}$$

The angular $\dot{\omega}_{output}$ acceleration of the transmission output shaft is thus formed from the quotient of the input torque $M_{input}$ and the torque of inertia $J_{TS}$ of the transmission. This includes the transmission components involved in the startup process, for example, the transmission input shaft, the gear pair, the transmission output shaft and side shafts of the drive. The output torque $M_{output}$ is furthermore a function of the clutch torque $M_{clutch}$, the total transmission ratio $i_{ges}$ in the startup gear and the transmission degree of efficiency η. Integrating two times computes a rotation angle $\phi_{input}$ or a respective rotation clearance to be compensated. Also in these contexts, a sufficiently small compensation torque or its curve can be derived over which the rotation clearance is integrated, adjusted at the friction clutch before startup and causes a compensation of the idle travel of the transmission without noisy impact. It has proven advantageous to predetermine the compensation torque as a function of time or a determined rotation angle of the rotation clearance in the form of an up sloping ramp to a target torque. Thus, the height of the target torque can be predetermined as a function of the rotation angle of the rotation clearance. Subsequently, the target torque can be reduced again, for example, in the form of a ramp to a smaller value or zero. Alternatively, the compensation torque can be predetermined as a torque impulse with a predetermined height or duration, whose integrated surface causes the transmission input shaft to perform the rotation.

The rotation angle can thus be predetermined as an empiric value for computing the compensation torque. However, it is particularly advantageous when providing the compensation torque or when the rotation angle of the rotation clearance is detected more precisely, in that the compensation torque required for compensating the rotation clearance is adapted during operations by continuously learning the rotation clearance. Thus, a determination of the rotation angle can be provided during pull/push-phases by processing the speed of the transmission input shaft. Thus, the speed can be determined through a transmission input shaft sensor or through computing the shifted gear from the wheel speeds. Alternatively or, for example, for redundancy reasons or due to a higher precision, the speed of the output shaft of the drive unit can be used when the friction clutch is completely closed, thus when there is no slippage. The amount of the rotation clearance can be determined at least with the required precision by comparing the speeds of the transmission input shaft and the transmission output shaft, for example, through a speed change, for example, a speed increase which is caused by a torque decrease caused during a switching from propulsion operation to coasting operation with rotation clearance. It is appreciated that a determination of the rotation clearance is also applicable in push-pull phases of the drive train.

In a shifting transmission, in particular a dual clutch transmission with plural startup gears, it has proven advantageous, due to the different transmission ratios, to configure the compensation torque as a function of the startup gear that is being used.

It has furthermore proven advantageous to apply the compensation torque preferably when the motor vehicle is standing still and a brake of the motor vehicle is actuated.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A drive train for a motor vehicle, comprising a drive unit having:
    a drive shaft; and,
    a transmission having a transmission input shaft and a plurality of gears, of which at least one is used as a starting gear for the motor vehicle, and having a friction clutch, which is arranged between the crankshaft and the transmission input shaft and is actuated in an automated manner, wherein a rotation clearance present in the transmission is compensated by applying a small compensating torque set at the friction clutch to the transmission input shaft while the starting gear is engaged before start up.

2. The drive train according to claim 1, wherein the compensation torque is smaller than a startup torque required for moving the motor vehicle.

3. The drive train according to claim 1, wherein the compensation torque required for compensating the rotation clearance is learned during operations of the drive train.

4. The drive train according to claim 1, wherein:
    the transmission includes an output shaft; and
    the rotation clearance is determined by comparing a speed of the transmission input shaft with a speed of the transmission output shaft.

5. The drive train according to claim 4, wherein a respective compensation torque is associated with the determined rotation clearance.

6. The drive train according to claim 1, the compensation torque is configured as a function of the startup gear used.

7. The drive train according to claim 1, wherein the rotation clearance is compensated when the motor vehicle is standing still and a brake of the motor vehicle is actuated.

8. A method for actuating a drive train for a motor vehicle including a drive unit having a drive shaft and a transmission having a transmission input shaft and a plurality of gears, of which at least one is used as a starting gear for the motor vehicle, and having a friction clutch, which is arranged between the crankshaft and the transmission input shaft and is actuated in an automated manner, the method comprising:
    compensating a rotation clearance present in the transmission by applying a small compensating torque set at the friction clutch to the transmission input shaft while the starting gear is engaged before start up, wherein:
    compensating the rotation clearance includes compensating the rotation clearance when the motor vehicle is standing still and a brake of the motor vehicle is actuated.

9. A drive train for a motor vehicle, comprising a drive unit having:
    a drive shaft; and,
    a transmission including an input shaft, an output shaft, a plurality of gears, and a friction clutch, wherein:
    a gear from the plurality of gears is used as a starting gear for the motor vehicle;
    the friction clutch is arranged between the crankshaft and the transmission input shaft and is actuated in an automated manner;
    a rotation clearance is present in the transmission;
    the rotation clearance is determined by comparing a speed of the transmission input shaft with a speed of the transmission output shaft; and
    the rotation clearance is compensated by applying a small compensating torque set at the friction clutch to the transmission input shaft while the starting gear is engaged before start up.

* * * * *